(12) United States Patent
Wang et al.

(10) Patent No.: US 10,541,602 B2
(45) Date of Patent: Jan. 21, 2020

(54) SPWM WITH DC OFFSET BASED ON TOTAL ENERGY REDUCTION

(71) Applicant: University of Florida Research Foundation, Inc., Gainesville, FL (US)

(72) Inventors: Shuo Wang, Gainesville, FL (US); Hui Zhao, Cambridge (GB); Le Yang, Gainesville, FL (US); Yingjie Zhang, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 16/175,254

(22) Filed: Oct. 30, 2018

(65) Prior Publication Data

US 2019/0131869 A1 May 2, 2019

Related U.S. Application Data

(60) Provisional application No. 62/579,094, filed on Oct. 30, 2017.

(51) Int. Cl.
*H02M 1/12* (2006.01)
*H02M 1/44* (2007.01)
(Continued)

(52) U.S. Cl.
CPC ............. *H02M 1/44* (2013.01); *H02M 1/12* (2013.01); *H02M 7/5395* (2013.01);
(Continued)

(58) Field of Classification Search
CPC ........ H02M 1/44; H02M 7/527; H02M 7/529; H02M 7/53873; H02M 1/12; H02M 2001/123
See application file for complete search history.

(56) References Cited

U.S. PATENT DOCUMENTS 10,153,714 B2 * 12/2018 Zhang ................... H02P 27/085
2010/0123419 A1 * 5/2010 Bonvin ............... H02M 7/5388
318/400.28
(Continued)

OTHER PUBLICATIONS

Bowes "Advanced Regular-Sampled PWM Control Techniques for Drives and Static Power Converters" IEEE Transactions on Industrial Electronics, vol. 42, No. 4 (Aug. 1995) pp. 367-373.

*Primary Examiner* — Alex Torres-Rivera
(74) *Attorney, Agent, or Firm* — Thomas Horstemeyer, LLP

(57) ABSTRACT

Various examples related to sinusoidal pulse width modulation (SPWM) techniques for harmonic and electromagnetic interference (EMI) noise suppression are provided. In one example, a method includes applying a DC offset to a sinusoidal modulation waveform to change an average duty cycle of a switching circuit; and controlling switching of an array of switches of the switching circuit based at least in part upon the offset sinusoidal modulation waveform and a carrier waveform, thereby reducing total energy. In another example, a system includes a switching circuit with an array of semiconductor switches that control application of a voltage source to a load; and controller circuitry that can control switching of the array of semiconductor switches by applying a DC offset to a sinusoidal modulation waveform to change an average duty cycle of the switching circuit.

20 Claims, 20 Drawing Sheets

(51) Int. Cl.
*H02M 7/5387* (2007.01)
*H02M 7/5395* (2006.01)

(52) U.S. Cl.
CPC ... *H02M 7/53871* (2013.01); *H02M 7/53873* (2013.01); *H02M 2001/123* (2013.01)

(56) References Cited

U.S. PATENT DOCUMENTS

| | | | |
|---|---|---|---|
| 2015/0200602 A1* | 7/2015 | Narimani | H02M 5/4585 |
| | | | 363/37 |
| 2016/0315558 A1* | 10/2016 | Lee | H02M 7/537 |
| 2016/0322890 A1* | 11/2016 | Lee | H02M 1/12 |
| 2018/0226879 A1* | 8/2018 | Wang | H02M 1/126 |
| 2018/0367021 A1* | 12/2018 | Mano | H02M 1/08 |

* cited by examiner

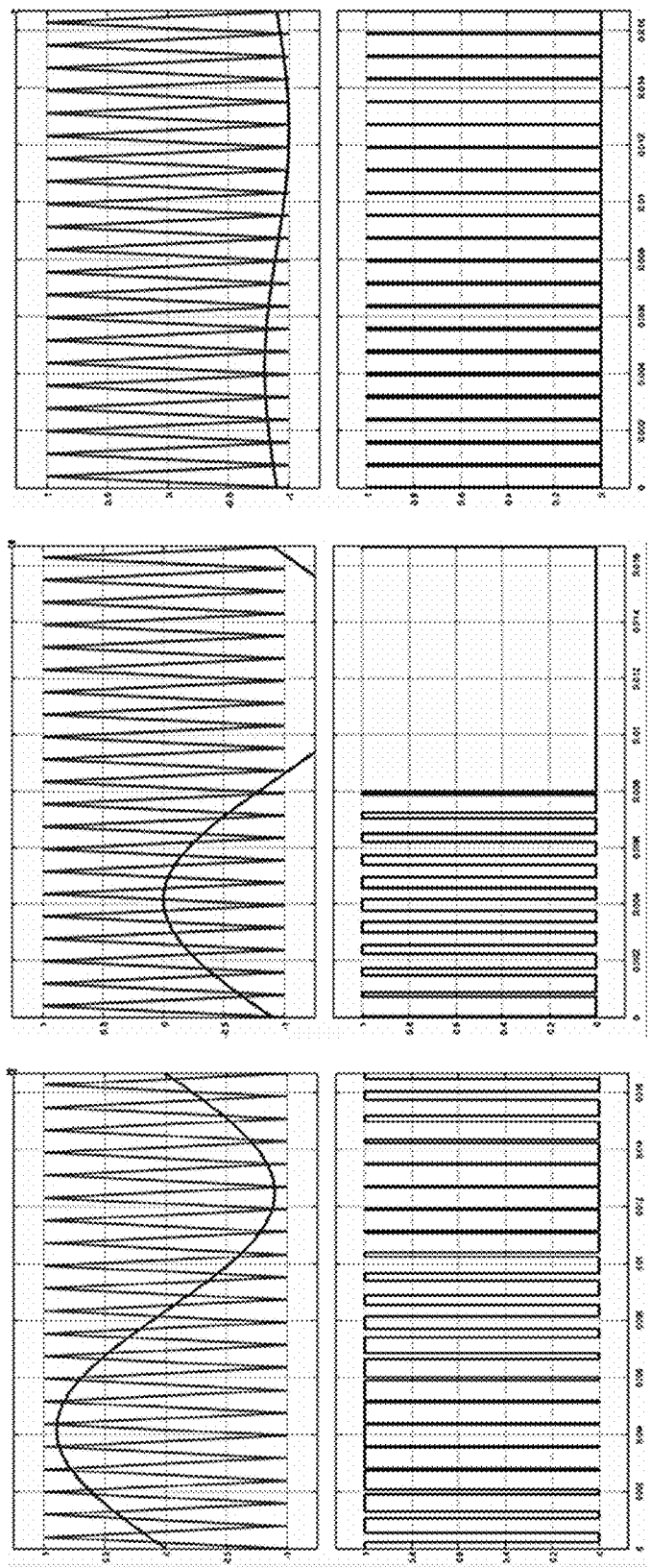

SPWM WITH DC OFFSET BASED ON TOTAL ENERGY REDUCTION

CROSS REFERENCE TO RELATED APPLICATIONS

This application claims priority to, and the benefit of, U.S. provisional application entitled "SPWM WITH DC OFFSET BASED ON TOTAL ENERGY REDUCTION FOR BOTH HARMONIC AND EMI NOISE SUPPRESSION" having Ser. No. 62/579,094, filed Oct. 30, 2017, the entirety of which is hereby incorporated by reference.

BACKGROUND

Pulse width modulation (PWM) inverters and rectifiers have been widely used in ac motor drivers, PV inverters, and EV battery chargers. The high dv/dt and di/dt cause many problems including large leakage current, electromagnetic interference (EMI) and motor bearing damage. Reduction of harmonics and EMI noise can reduce damage and increase power density.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 6A-6C illustrate the effect of DC offset on the average duty cycle, in accordance with various embodiments of the present disclosure.

DETAILED DESCRIPTION

Figure 1:
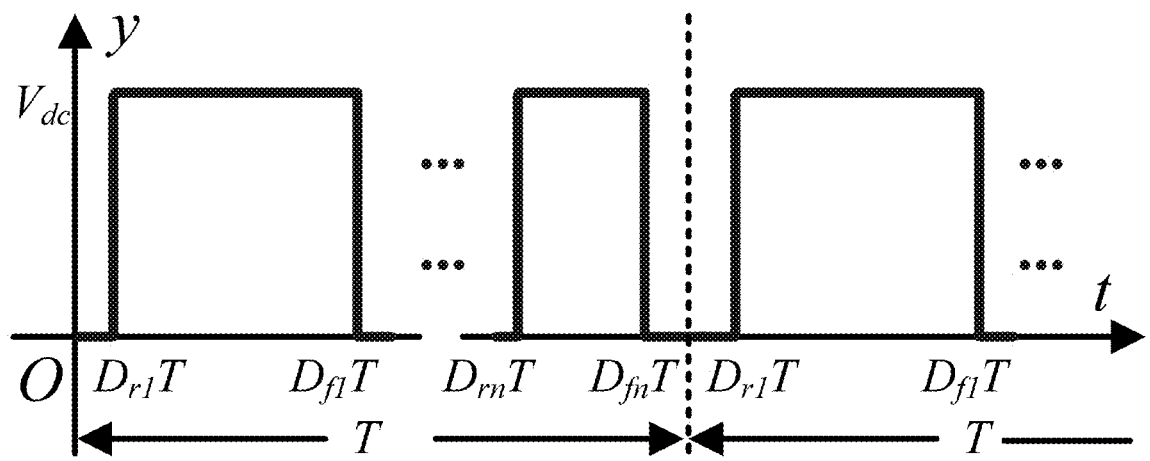
FIGS. 1 and 2 illustrate voltage and harmonic energy waveforms of a single switch, in accordance with various embodiments of the present disclosure.

Disclosed herein are various examples related to sinusoidal pulse width modulation (SPWM) techniques for harmonic and EMI noise suppression. The SPWM techniques can use DC offset based on total energy reduction. Reference will now be made in detail to the description of the embodiments as illustrated in the drawings, wherein like reference numbers indicate like parts throughout the several views.

Pulse width modulation (PWM) inverters and rectifiers have been widely used in ac motor drivers, PV inverters, and EV battery chargers. The high dv/dt and di/dt cause many problems including large leakage current, electromagnetic interference (EMI) and motor bearing damage. Several techniques can be used to suppress the introduced harmonic noise and EMI noise, including passive filters, active filters, wheatstone bridge balance techniques, multilevel topologies, advanced inductor/transformer, shielding technique, micro-mechanical structure improvement and advanced modulation techniques. The advanced modulation techniques are very promising because they can reduce the EMI noise without extra hardware requirements and can hence increase the power density.

Most modulation techniques focus on improvement of the space vector PWM (SVPWM) by rearranging the output voltage vectors. However, the advanced SVPWM can introduce extra drawbacks, such as reducing the maximum fundamental voltage, and generating extra harmonics in the differential mode (DM) spectrum. Moreover, both the conventional and advanced SVPWM can only be used in three-phase system, but cannot be applied in applications with a half-bridge or H-bridge. Therefore, their application is still limited.

The optimal modulation techniques including selective harmonic elimination (SHE), selective harmonic mitigation/selective harmonic current mitigation (SHM/SHCM) and selective harmonic compensation (SHC) can also improve the current quality. However, all the optimal techniques are mostly used to improve the voltage/current quality within the harmonic range, not the EMI range. It has been concluded that SHE would increase the harmonic within the uncontrolled range, but it is unclear if the conclusion is still valid for other optimal techniques such as SHM/SHCM and SHC. Moreover, the optimal modulation techniques are more complicated to realize, the dynamic response is slow, and hence its application is limited.

Techniques which modify both modulation methods and circuit topology have been developed to reach the optimal performance. For example, an open-end winding induction motor and one extra three phase inverter has been used for an SVPWM for the suppression of zero-sequence current in a four-level open end winding induction motor drive with nested rectifier inverter. The extra inverter is installed at the end of the motor winding to circumvent the common mode (CM) noise's path. The technique has significant EMI suppression, but can only be used in limited applications and the cost is extremely high for manufacturing special motor. An extra capacitor and the modulation technique has been applied in a modified single-phase H-bridge PWM rectifier with power decoupling to suppress the second order harmonic to improve the harmonic quality, but the cost would also increase.

Although advanced modulation techniques have been discussed in various papers, the improvement on the sinusoidal pulse width modulation (SPWM) technique is limited. One reason is that if the carrier and modulation waveforms are determined, the waveforms are fixed. Therefore, it is usually believed that the improvement of SPWM is limited. Moreover, simulations have shown that the total THD (total harmonic distortion) is almost constant for all kinds of SPWM techniques. It has been indicated that SHE has higher harmonics within its uncontrollable range, since it eliminates all the harmonic within the controllable range. However, the expression of THD is not derived, and it is unclear if it can be reduced.

In this disclosure, a closed form expression of total harmonic energy for a single bridge is derived. Based the expression for the total energy, a SPWM with DC offset is then proposed to reduce the total harmonic, the harmonic noise and EMI noise. Initially, the closed form expression for total energy is derived for a general two level square waveform, including consideration of factors that affect the harmonic energy. Next, a SPWM technique is described to reduce the harmonic noise and EMI noise by reducing the total energy. Considerations for industrial applications, such as the DC offset and the range of modulation index, which can be introduced by the modulation technique are also discussed. Simulations and experiments were conducted to verify that the expression is valid for various applications and the proposed modulation technique can significantly improve both the harmonics and EMI noise.

Analysis on Total Energy and Harmonic Energy

Harmonic energy is an important factor to evaluate current quality. Standards such as Std. 519 take the total harmonic distortion (THD) as one of the major factors to reflect the harmonic quality. Random PWM can decrease the peak value by expanding the harmonic energy within a wide range. But the closed form equation of the harmonic energy has not been derived and it is usually believed that the THD will not be changed by random PWM.

Total Energy is Constant for the Single Switch.

Semi-conductor switches (e.g., MOSFETs, IGBTs, diodes) are the basic components for power conversion. The voltage across a single switch is either 0 or $V_{dc}$ as shown in FIG. 1, where the voltage rises from 0 to $V_{dc}$ at $D_{ri}T$ and falls back to 0 at $D_{fi}T$ for $i=1, \ldots, n$ in each period of time T. Assuming the switching sequence (1 . . . n) repeats itself for every T second, then a Fourier Series can be applied to extract the voltage spectrum:

$$u(t) = \frac{1}{2}a_0 + \sum_{m=1}^{\infty}(a_m \cos(m\omega t) + b_m \sin(m\omega t)) \quad (1)$$
$$= \frac{1}{2}a_0 + \sum_{m=1}^{\infty} c_m \cos(m\omega t + \theta_m)$$

The term $\frac{1}{2} a_0$ can be shifted to the left-hand side (LHS) of equation (1) to obtain:

$$u(t) - \frac{1}{2}a_0 = \sum_{m=1}^{\infty} c_m \cos(m\omega t + \theta_m). \quad (2)$$

The average square of the right-hand side (RHS) of equation (2) is:

$$\frac{1}{T}\int_0^T \left(\sum_{m=1}^{\infty} c_m \cos(m\omega t + \theta_m)\right)^2 dt = \quad (3)$$

$$\frac{1}{T}\int_0^T \sum_{i=1}^{\infty}\sum_{j=1}^{\infty} c_i \cos(i\omega t + \theta_i) c_j \cos(j\omega t + \theta_j) dt =$$

$$\frac{1}{T}\left(\begin{array}{c}\int_0^T \sum_{i=1}^{\infty}(c_i \cos(i\omega t + \theta_i))^2 dt \\ + \int_0^T \sum_{i=1}^{\infty}\sum_{j=1}^{\infty} c_i c_j \cos(i\omega t + \theta_i)\cos(j\omega t + \theta_j) dt\end{array}\right) = \frac{1}{2}\sum_{m=1}^{\infty} c_m^2$$

As shown in equation (3), the average square of equation (2) is the total energy of any square waveform.

Figure 2:
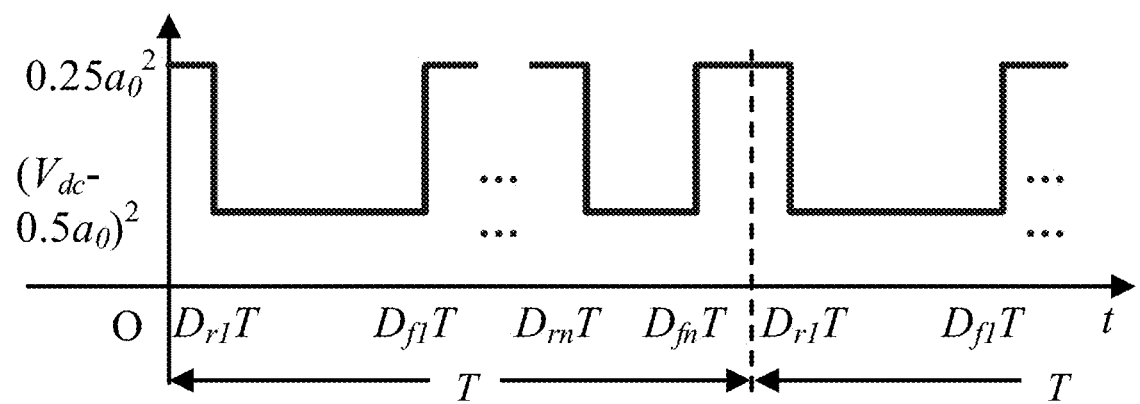

The square of the LHS of equation (2) is equal to the term of equation (3), and is also the total harmonic energy. The total harmonic energy waveform for a single switch is illustrated in FIG. 2. The average square value of the LHS of equation (2) can be calculated as:

$$\frac{1}{T}\int_0^T \left(u(t) - \frac{1}{2}a_0\right)^2 dt = \overline{D}(1-\overline{D})V_{dc}^2, \quad (4)$$

where $\overline{D}$ is the average duty cycle of the switching frequency, $$\overline{D} = \sum_{i=1}^{\infty}(D_{fi} - D_{ri}). \quad (5)$$

Because the average square values of the RHS and LHS of equation (2) should be equal to each other, the total energy ($TENG_{SW}$) can be defined as the variable:

$$TENG_{SW} = \frac{1}{2}\sum_{m=1}^{\infty} c_m^2 = \overline{D}(1-\overline{D})V_{dc}^2. \quad (6)$$

Figure 3A:
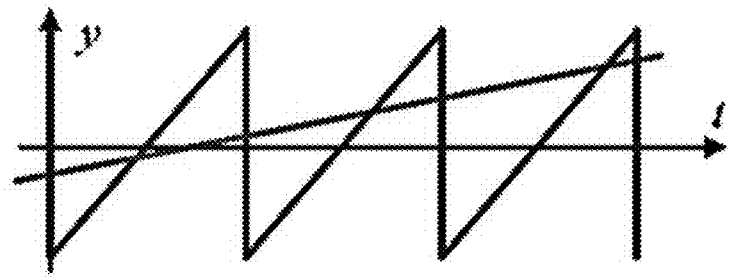
FIGS. 3A-3E illustrate examples of modulation techniques for sinusoidal pulse width modulation (SPWM), in accordance with various embodiments of the present disclosure.
Figure 3B:
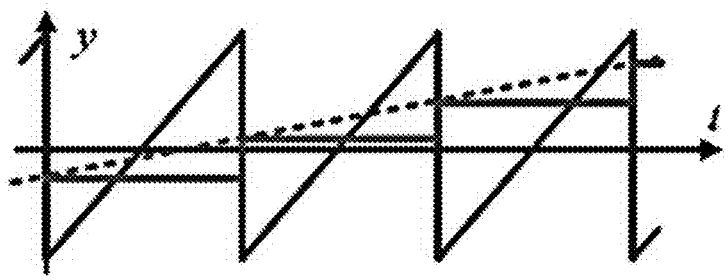
Figure 3C:
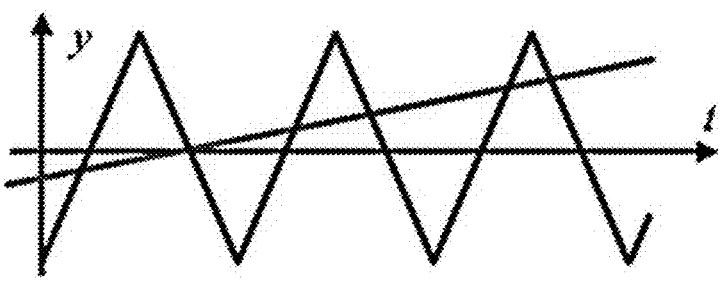
Figure 3D:
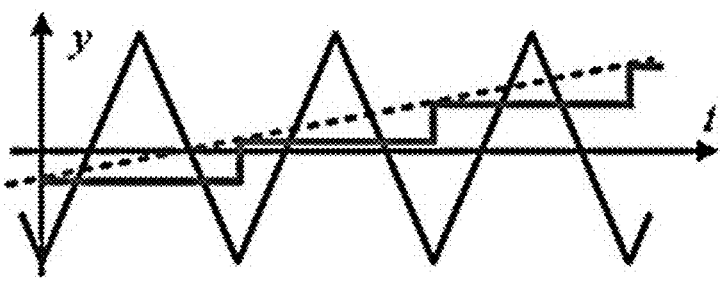
Figure 3E:
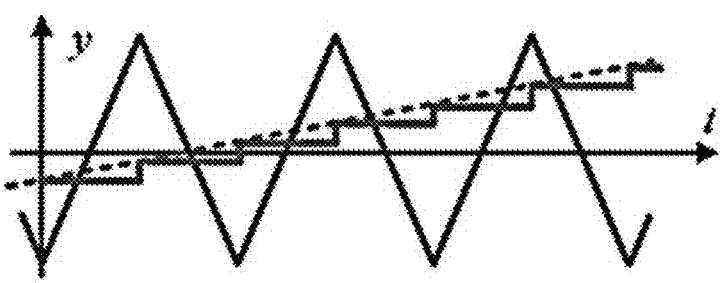

Referring to FIGS. 3A-3E, shown are examples of typical modulation techniques for SPWM including a sawtooth carrier with natural sampling in FIG. 3A, a sawtooth carrier with regular sampling in FIG. 3B, a triangle carrier with natural sampling in FIG. 3C, a triangle carrier with symmetrical natural sampling in FIG. 3D, and a triangle carrier with asymmetrical natural sampling in FIG. 3E. For conventional SPWM modulation techniques as shown in FIGS. 3A-3E, $\overline{D}=0.5$, and the total energy can be further simplified from equation (6) as:

$$TENG_{SW} = 0.25 V_{dc}^2. \quad (7)$$

This result demonstrates that the total energy is only related to the DC voltage $V_{dc}$. Other parameters such as, switching frequency, modulation index, carrier waveform, and/or modulation techniques do not have an effect on the $TENG_{SW}$. Because equation (7) seems to violate empirical common sense, verification simulations were carried out. The results are discussed below, with respect to FIGS. 8A-8J and 9A-9J.

Total Harmonic Energy is Constant for Inverters/Rectifiers.

Figure 4A:
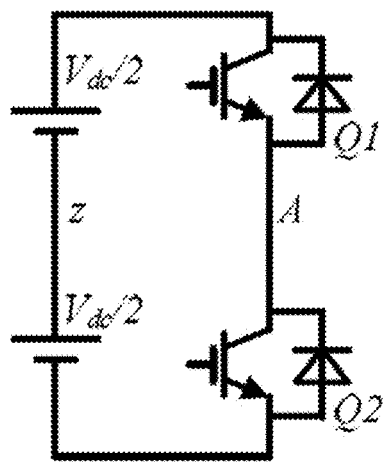
FIGS. 4A-4D illustrate examples of inverter/rectifier switching circuits, in accordance with various embodiments of the present disclosure.
Figure 4B:
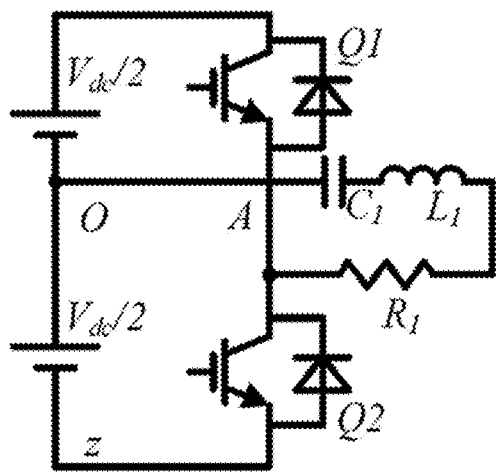
Figure 4C:
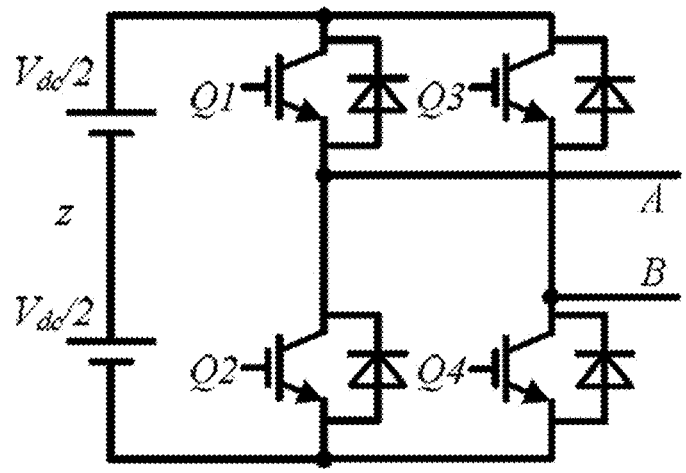
Figure 4D:
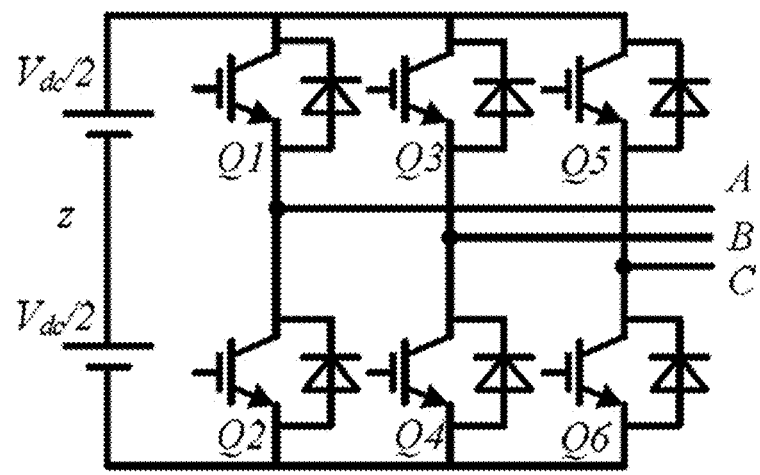

Half bridge, H-bridge and three phase bridge circuits are the most commonly used in inverters/converters. Examples of the topologies are illustrated in FIGS. 4A-4D. The half bridge circuit of FIG. 4A is used to initially derive the equations for total harmonic energy, and then the harmonic energy in the H-bridge and three phase bridge circuits of FIGS. 4C and 4D is examined. The typical modulation techniques are as shown in FIGS. 3A-3E.

Since $v_{AZ}$ is a square waveform which is similar to the waveform in FIG. 2, its total energy is also similar to:

$$TENG_{HFB}=0.25V_{dc}^2. \quad (8)$$

Among all the harmonics, the fundamental component, $c_1$ is $MV_{dc}$. Therefore, the total harmonic distortion (THD) and total demand distortion (TDD) of the voltage can be calculated as $$THD = \sqrt{\frac{\sum_{m=2}^{\infty} c_m^2}{c_1^2}} = \sqrt{\frac{\sum_{m=1}^{\infty} c_m^2 - c_1^2}{c_1^2}}, \text{ and} \quad (9)$$

$$= \sqrt{\frac{2TENG_{HFB} - (0.5MV_{dc})^2}{(0.5MV_{dc})^2}} = \sqrt{\frac{2-M^2}{M^2}}$$

$$TDD = \sqrt{\frac{\sum_{m=2}^{\infty} c_m^2}{c_{1max}^2}} = \sqrt{\frac{\sum_{m=1}^{\infty} c_m^2 - c_1^2}{(0.5V_{dc})^2}} \quad (10)$$

$$= \sqrt{\frac{2TENG_{HFB} - (0.5MV_{dc})^2}{0.25V_{dc}^2}} = \sqrt{2-M^2}$$

For the H-bridge and three phase bridge circuits of FIGS. 4C and 4D, the situations are more complicated. The major reason is that the harmonics in each half bridge can be compensated with each other. For example, in an H-bridge circuit with a triangle carrier with symmetrical natural sampling modulation technique, the first significant harmonics can be compensated with each other, the total harmonic would be reduced and the equivalent switching frequency would be doubled.

However, it should be noted that both the H-bridge and the three phase bridge circuits are formed by half bridges, and the energy of each phase voltage is still constant, and the energy will not just disappear. From an EMI perspective, the line-to-line voltage is a DM voltage. If the energy of the DM voltage (line-to-line voltage) decreases, then CM voltage would increase. Simulation verification was performed and is discussed below with respect to FIG. 12C.

Harmonic Voltage.

Equations (9) and (10) are the closed form expressions of the THD and TDD for the phase voltage. The THD and TDD of the phase voltage is plotted with respect to the modulation index in FIG. 5, which shows that the most important harmonics for both THD and TDD happen at the least (or lowest) modulation index. If equation (7) holds, when the fundamental component is small, then the total harmonic is large so that the total energy can be constant. Common mode voltage, bearing current and EMI noise increases under light load conditions, which verifies the effectiveness of the conclusion.

SPWM with DC Offset

Equations (8), (9) and (10) demonstrate that the total harmonic energy is constant, and is not related to switching frequency and modulation techniques. However, this conclusion is based the assumption that $\overline{D}=0.5$, which holds for conventional SPWM modulation techniques. There are two reasons for conventional modulation techniques to select $\overline{D}$ as 0.5. First, $\overline{D}=0.5$ can eliminate the DC component of the phase voltage $v_{AZ}$; secondly, if $\overline{D}$ does not equal to 0.5, the range of modulation index would be reduced.

Referring to FIGS. 6A-6C, shown are plots illustrating the effect of the average duty cycle $\overline{D}$, DC offset and modulation index. FIG. 6A shows that during normal operation of a conventional SPWM method with $\overline{D}=0.5$ and the DC offset=0, a modulation index of M=0.9 can be generated. In contrast, FIG. 6B shows that with $\overline{D}=0.05$ and the DC offset=$-0.45V_{dc}$, M=0.9 cannot be generated because of the over modulation range. When the DC offset is too large, the modulation waveform exceeds the limits of the carrier producing saturation. As shown in FIG. 6C, normal operation with $\overline{D}=0.05$ and the DC offset=$-0.45V_{dc}$ is possible with M=0.1.

The first issue (where DC offset does not equal zero) is usually not detrimental in industrial applications. When a load is coupled to the half bridge converter of FIG. 4A, such as shown in FIG. 4B, an isolation capacitor $C_1$ can isolate the DC components no matter which modulation technique the converter applies. In H-bridge converters and three phase converters, if the DC offset in each phase is equal to each other, there is no DC current in the line-to-line current(s). Actually, in three phase applications, the phase voltage with DC offset is common with many kinds of space vector PWM (SVPWM) techniques. For an example, discontinues PWM (DPWM). The reason is that zero vectors $S_0$ and $S_7$ are not necessarily evenly distributed in SVPWM.

The second issue (the sacrifice of the modulation index). If $\overline{D}\approx0.5$, modulation index range would be limited. Therefore, to obtain the full modulation index range and to improve the harmonic at the same time, $\overline{D}$ can be adjusted based on modulation index.

$$\overline{D}=M/2. \quad (11)$$

Figure 5:
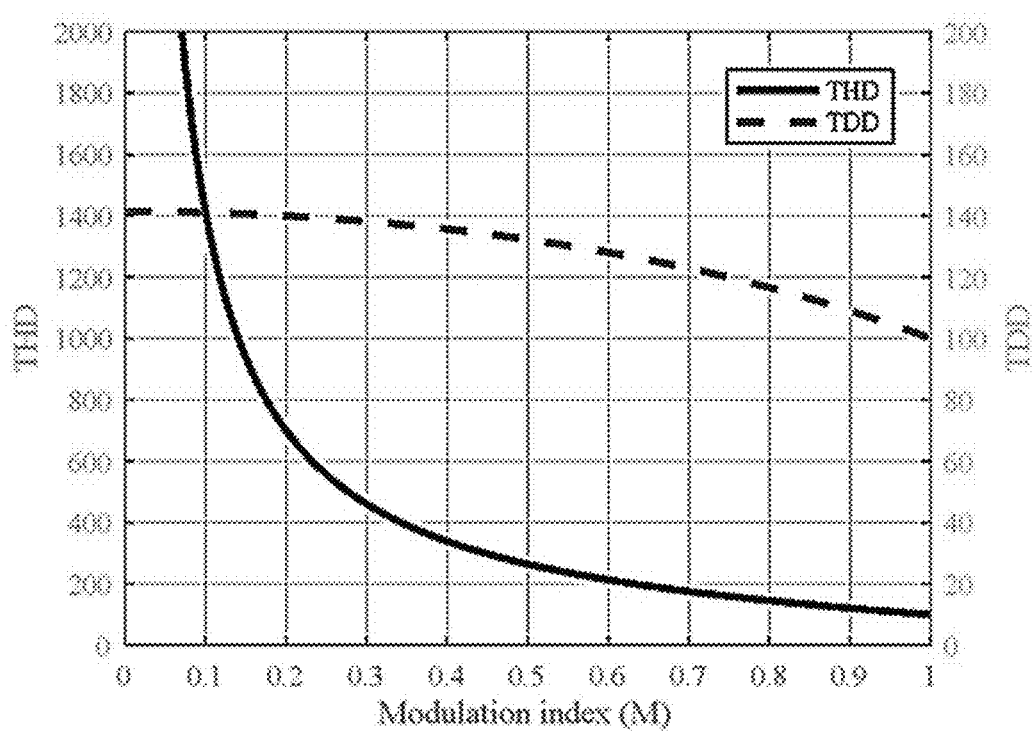
FIG. 5 illustrates the effect of modulation index on THD (total harmonic distortion) and total demand distortion (TDD), in accordance with various embodiments of the present disclosure.

It should be noted that the maximum issue happens at the least modulation index, as shown in FIG. 5. Therefore, when modulation is small, the original harmonic energy is the largest, and the improvement of the proposed technique is most significant, and the worst case (the greatest harmonic energy) is reduced. Substituting equation (11) into equation (6) gives the total energy of the half bridge and switch as:

$$TENG_{HFB}=TENG_{SW}=\tfrac{1}{2}\sum_{m=1}^{\infty}c_m^2=0.5M(1-0.5M)V_{dc}^2 \quad (12)$$

The equations for THD and TDD can be derived by substituting equation (12) into equations (9) and (10).

$$THD = \sqrt{\frac{\sum_{m=2}^{\infty} c_m^2}{c_1^2}} = \sqrt{\frac{2TENG_{HFB} - (0.5MV_{dc})^2}{(0.5MV_{dc})^2}} \quad (13)$$

$$= \sqrt{\frac{M(1-0.5M)^2 - 0.25M^2}{0.25M^2}} = \sqrt{\frac{4-3M}{M}}$$

$$TDD = \sqrt{\frac{\sum_{m=2}^{\infty} c_m^2}{c_{1max}^2}} = \sqrt{\frac{2TENG_{HFB} - (0.5MV_{dc})^2}{0.25V_{dc}^2}} \quad (14)$$

$$= \sqrt{\frac{M(1-0.5M)V_{dc}^2 - (0.5MV_{dc})^2}{0.25V_{dc}^2}} = \sqrt{4M-3M^2}$$

Figure 7A:
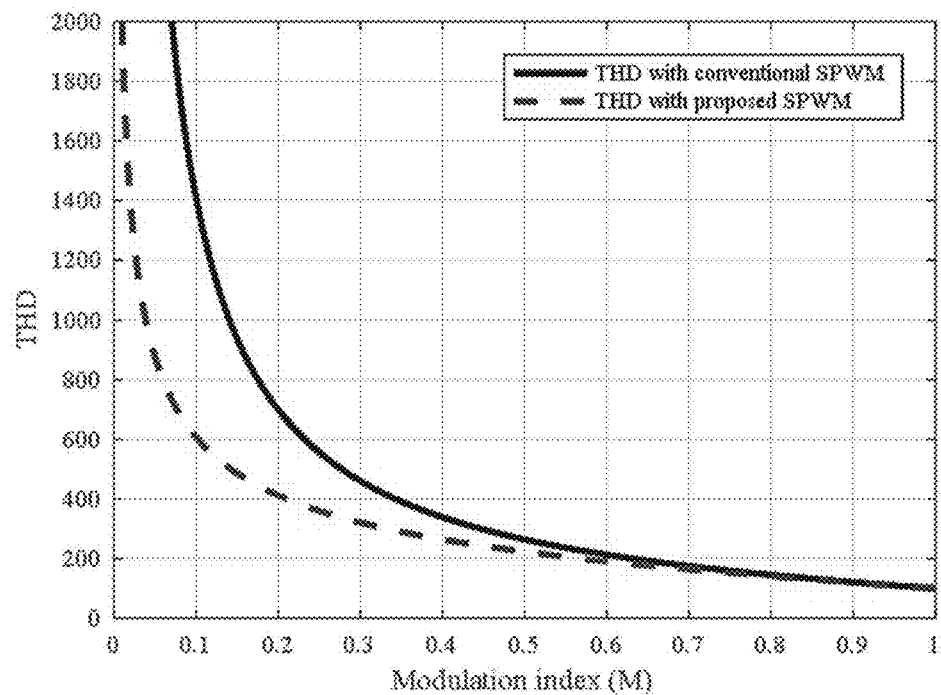
FIGS. 7A and 7B illustrate the effect of modulation index on THD (total harmonic distortion) and total demand distortion (TDD) with DC offset, in accordance with various embodiments of the present disclosure.
Figure 7B:
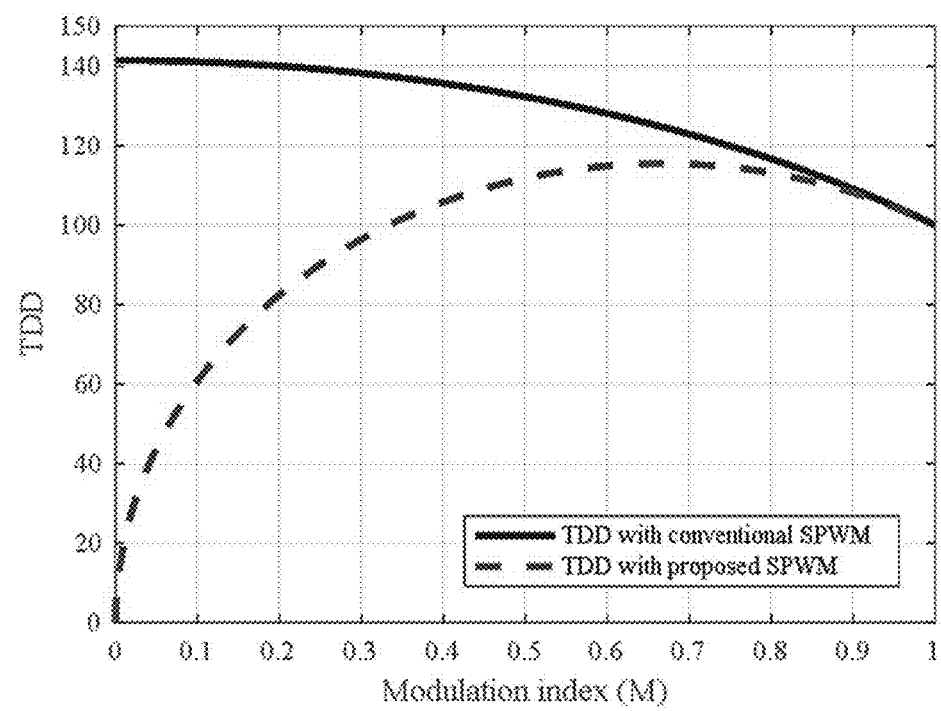
Figure 8A:
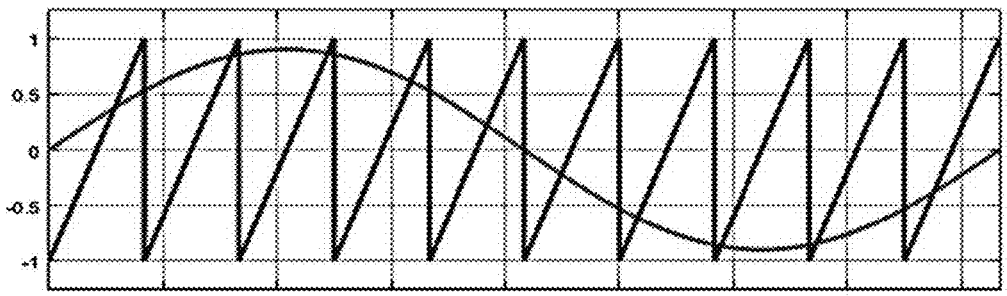
FIGS. 8A-8J and 9A-9J illustrate examples of TDD with different modulation techniques, in accordance with various embodiments of the present disclosure.
Figure 8B:
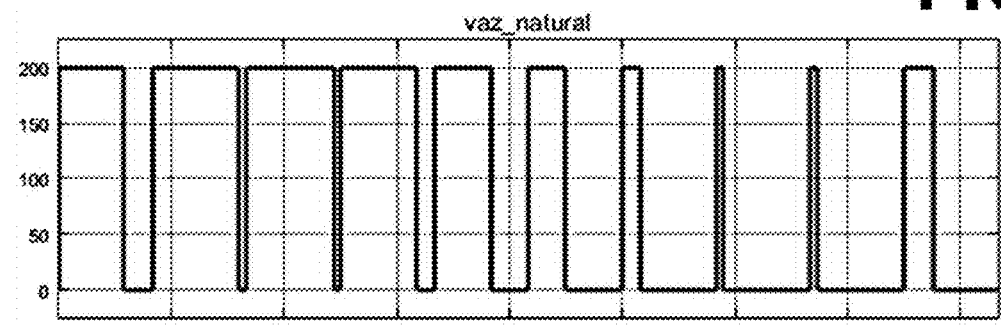
Figure 8C:
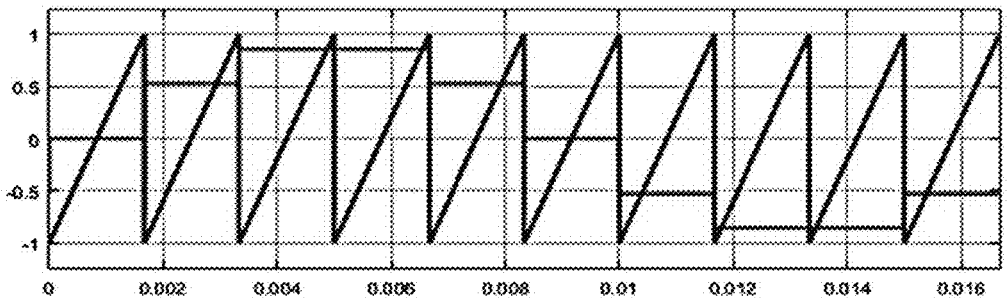
Figure 8D:
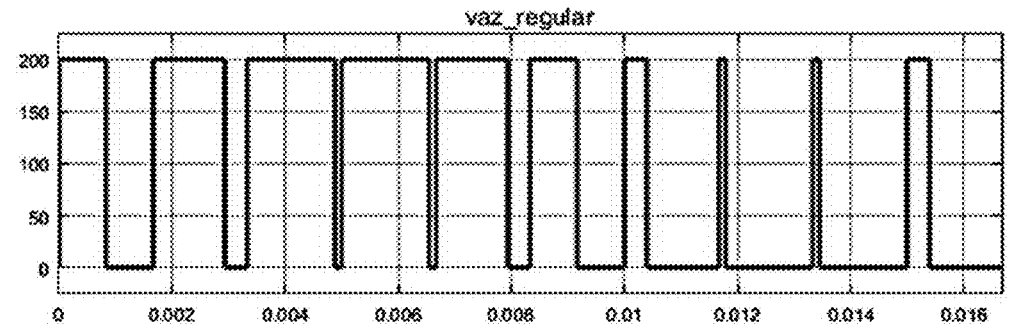
Figure 8E:
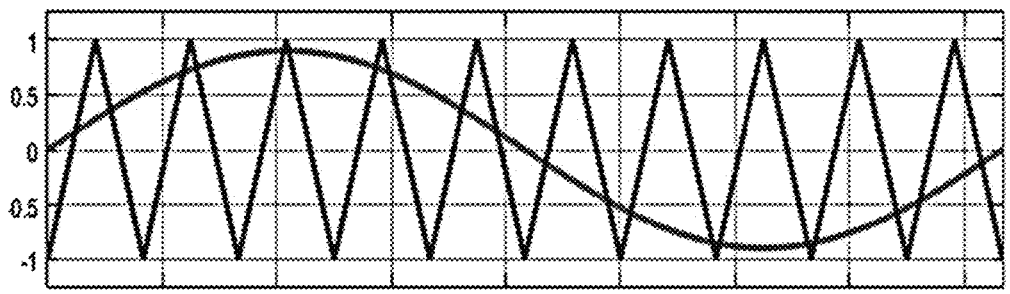
Figure 8F:
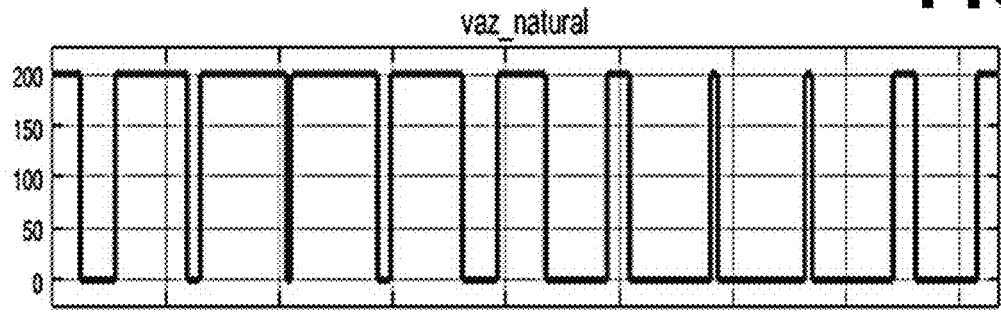
Figure 8G:
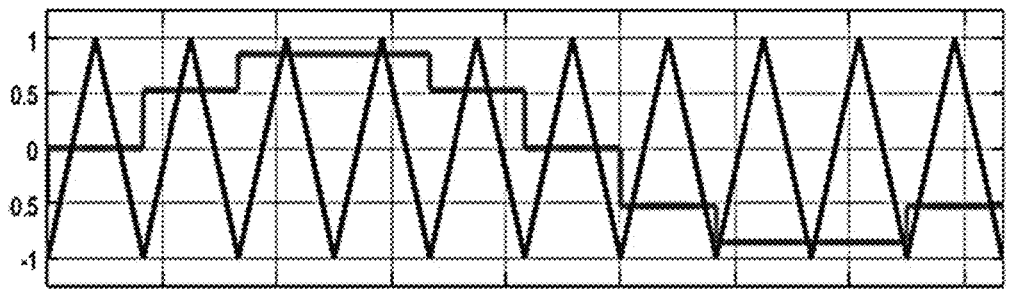
Figure 8H:
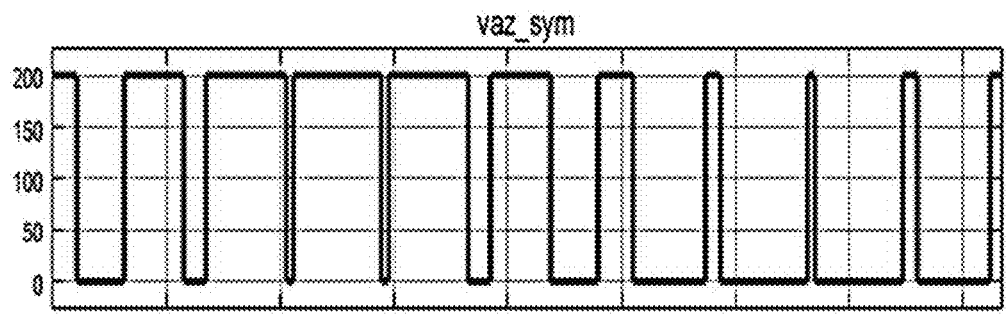
Figure 8I:
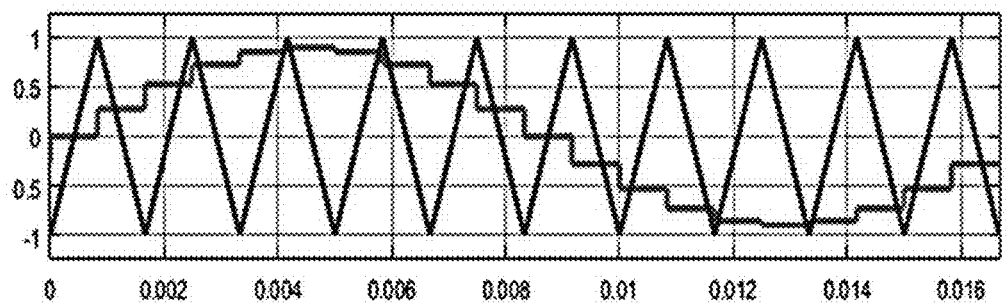
Figure 8J:
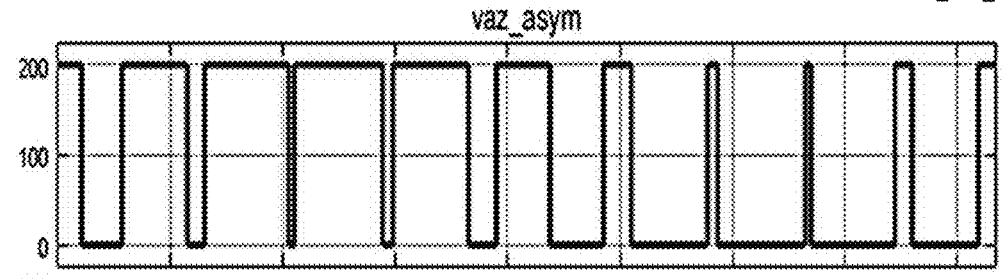
Figure 9A:
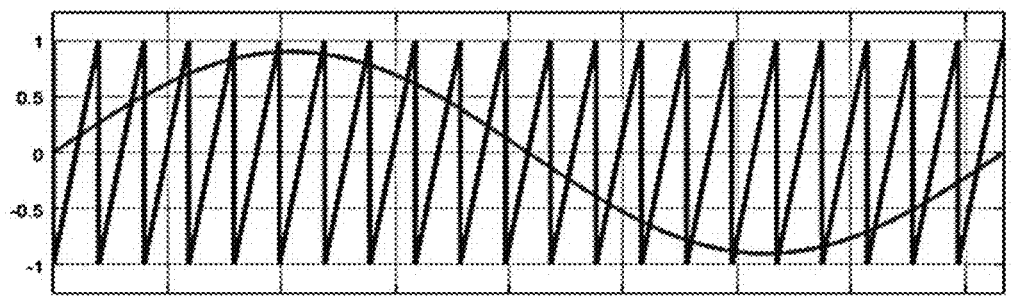
Figure 9B:
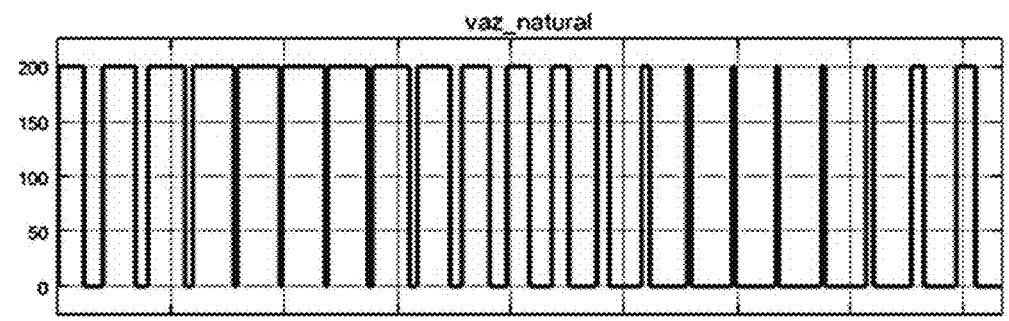
Figure 9C:
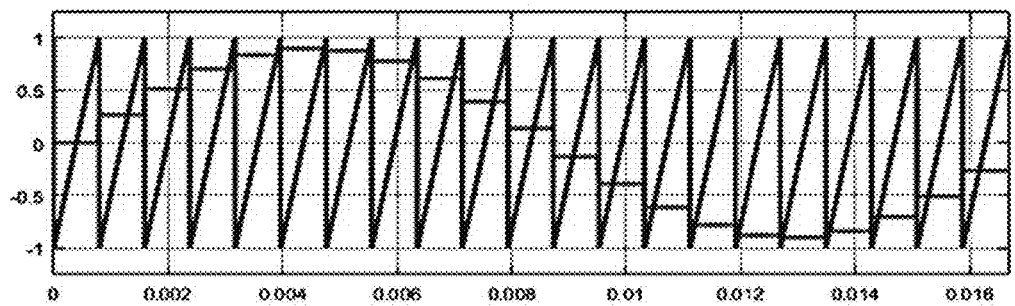
Figure 9D:
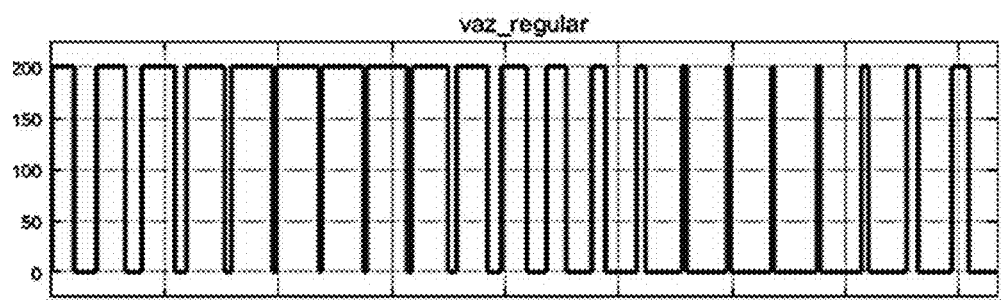
Figure 9E:
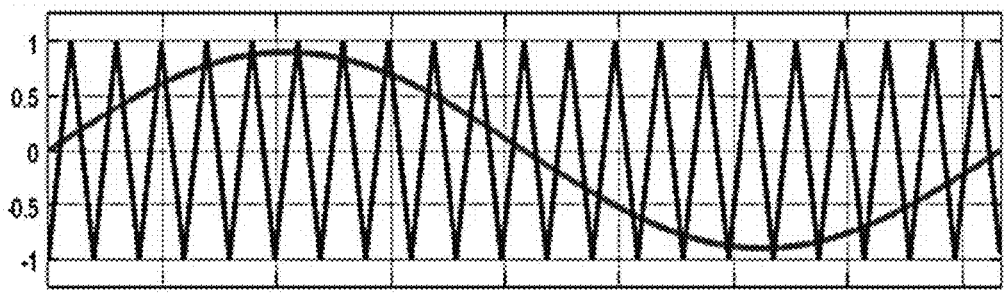
Figure 9F:
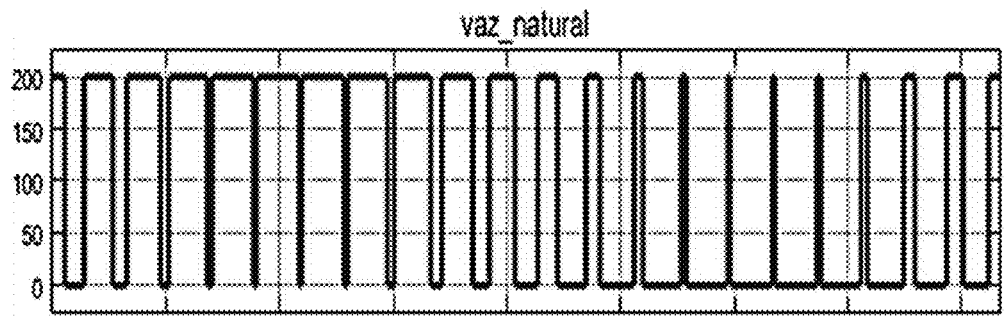
Figure 9G:
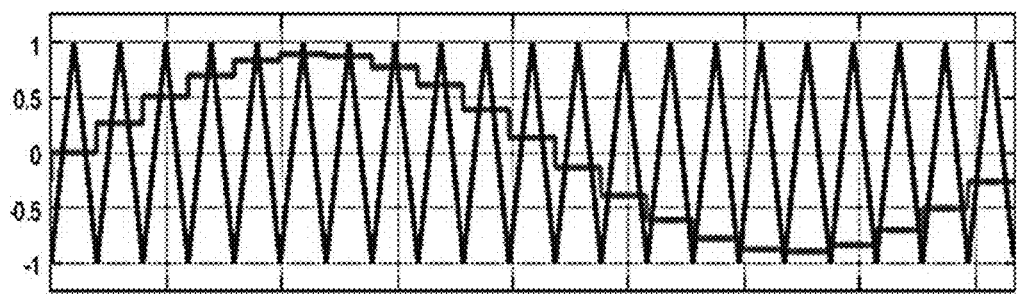
Figure 9H:
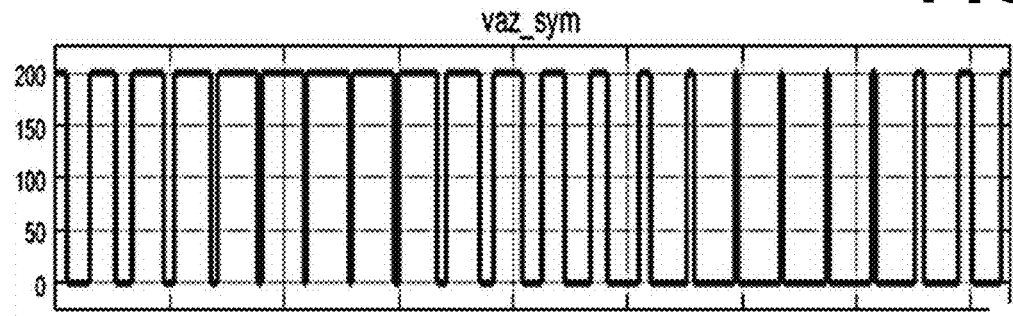
Figure 9I:
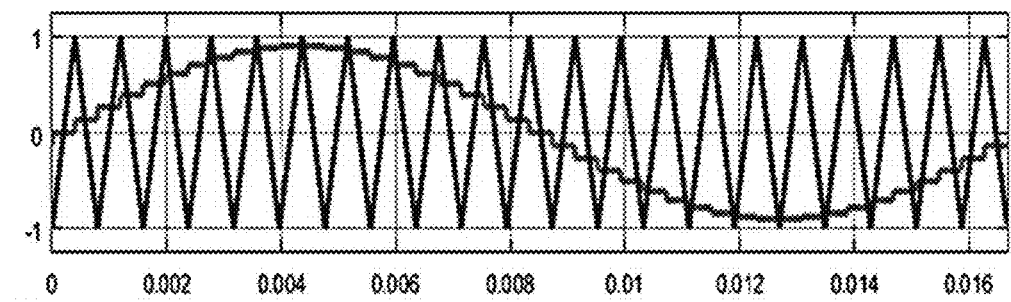
Figure 9J:
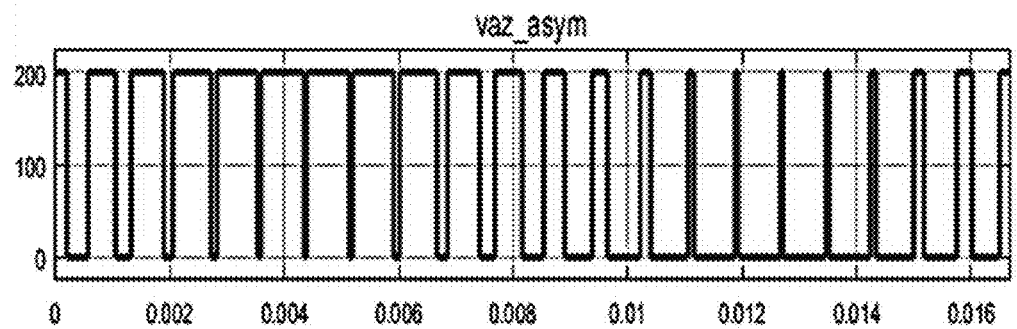

FIGS. 7A and 7B illustrate comparisons of THD and TDD within whole modulation index range between conventional SPWM and the disclosed modulation technique with DC offset. FIGS. 7A and 7B show that, for the original situation, the maximum harmonic energy appears when modulation index is small. With the disclosed SPWM technique with DC offset, both the TDD and THD have significant improvement for the whole modulation range, especially when modulation range is small. For example, the index modulation range can be less than 0.6, less than 0.5, less than 0.4, less than 0.3 or other ranges as appropriate.

A small modulation index is a typical operating point for many kinds of converters: for battery chargers, a small modulation index means no load condition; for motor drive systems, a small modulation index means motor starting or low speed condition (not necessarily light load/torque); for static synchronous compensators (STATCOM) or four quadrant inverters/rectifiers, a small modulation index means large reactive power or rated reactive power. Because a small modulation index is a common operating condition, it is advantageous to apply the disclosed technique with DC offset.

Simulations and Experiments

Simulations and experiments were carried out to verify the results discussed above. The harmonic and EMI noise are compared between the conventional SPWM and disclosed SPWM technique with DC offset in half bridge, H-bridge and three phase bridge rectifiers/inverters.

Half Bridge Rectifier/Inverter.

Referring back to FIG. 4B, shown is the common half bridge rectifier/inverter of FIG. 4A coupled to a load, the capacitor $C_1$ is used to isolate the DC components. The application of a single bridge rectifier includes the PFC circuit, half bridge rectifier. Control of the rectifiers/inverters can be provided by controller circuitry including a processor and memory, and drive circuitry for the switches (e.g., MOSFETs, IGBTs, diodes).

FIGS. 8A-10D show simulation results for different modulation techniques and switching frequencies. Five modulation techniques are considered: (a) a saw carrier waveform with natural sampling; (b) a saw carrier waveform with regular sampling; (c) a triangle carrier waveform with natural sampling; (d) a triangle carrier waveform with symmetrical regular sampling; and (e) a triangle carrier waveform with asymmetrical regular sampling. With a switching frequency of $f_{sw}$=600 Hz, FIGS. 8A, 8C, 8E, 8G and 8I illustrate the five different modulation techniques, and FIGS. 8B, 8D, 8F, 8H and 8J illustrate the output waveforms generated from using the corresponding modulation As can be seen, the outputs are slightly different from each other.

Compared with FIGS. 8A-8J, the switching frequency is changed from 600 Hz to $f_{sw}$=12.6 kHz in FIGS. 9A-9J. Simulink powergui tool was used to extract the THD of the generated waveforms, and the THD for all the waveform was found to equal 121%. The value matches with equation (9) and FIG. 5, and verifies that the total harmonic energy is not related to the modulation techniques or switching frequency.

Figure 10A:
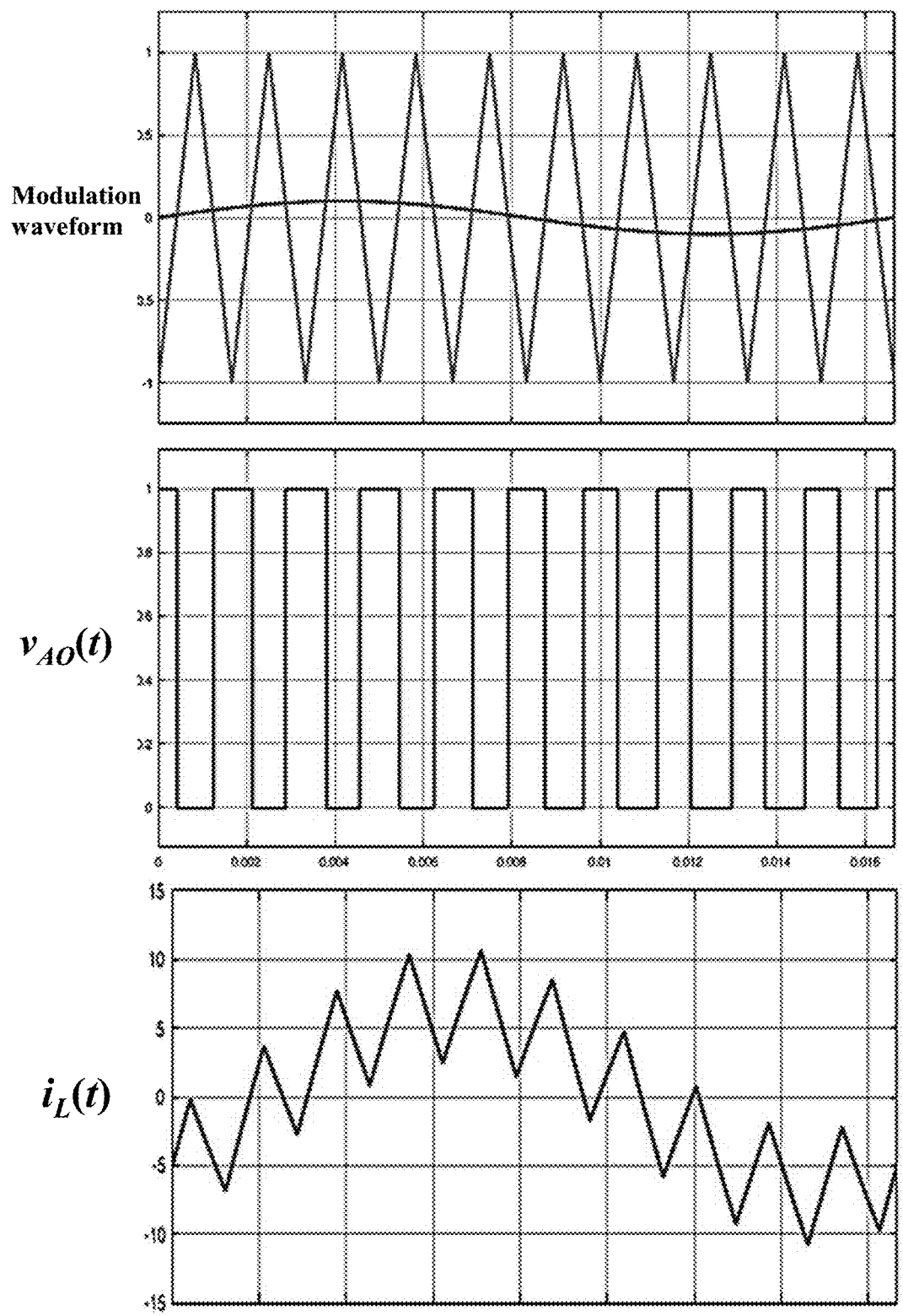
FIGS. 10A-10D illustrate examples of simulation results for SPWM modulation without and with DC offset, in accordance with various embodiments of the present disclosure.
Figure 10B:
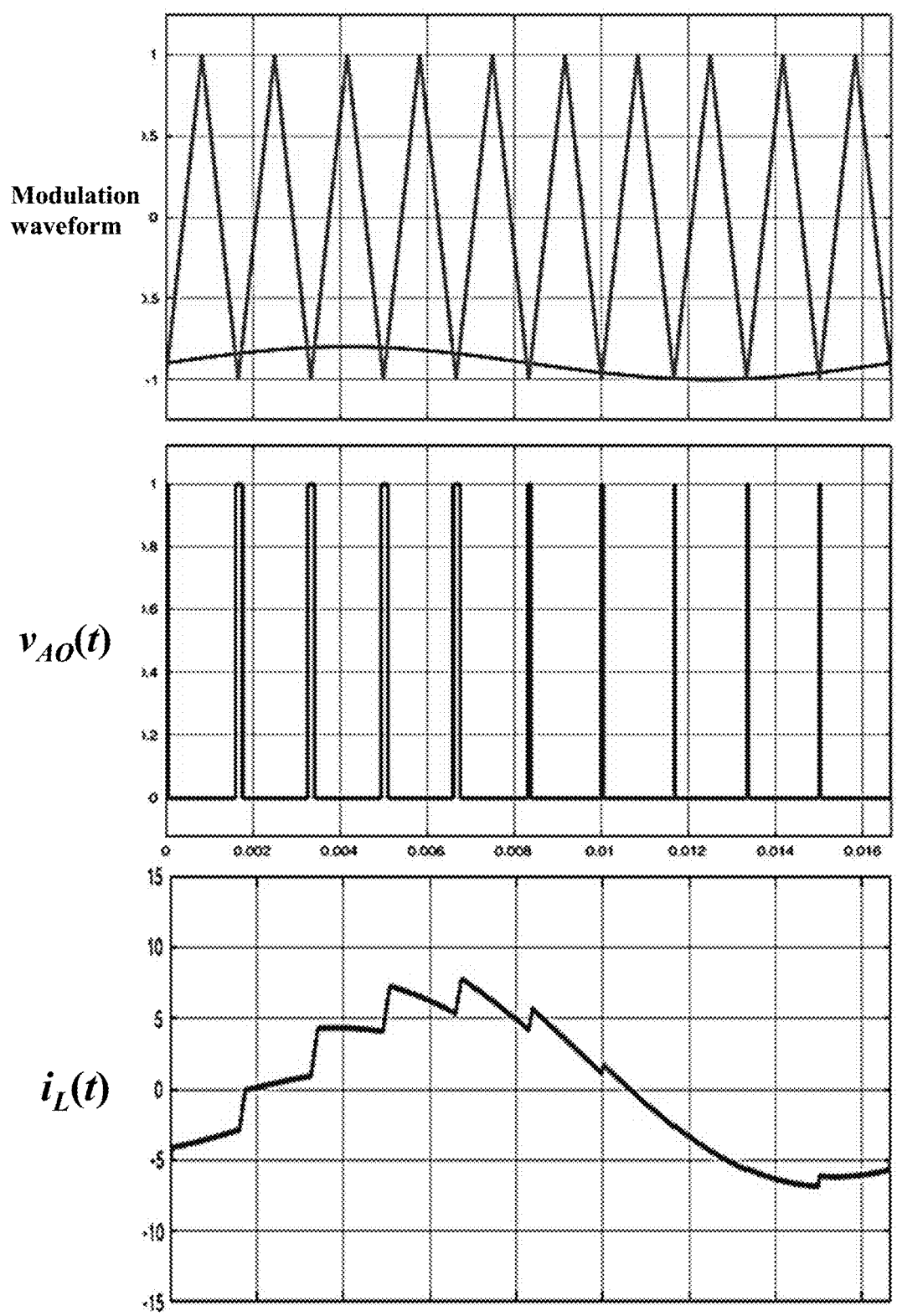

FIGS. 10A and 10B show simulation results with $f_{sw}$=600 Hz and M=0.1, that compare the modulation techniques and output waveforms of the conventional SPWM and the disclosed technique with DC offset.

Figure 10C:
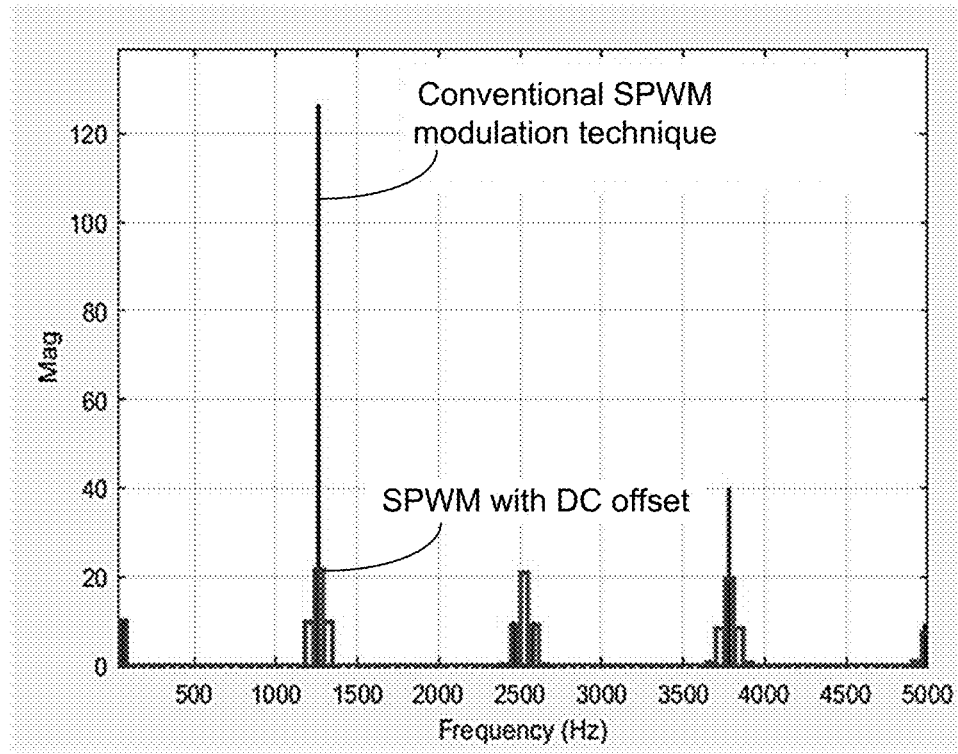
Figure 10D:
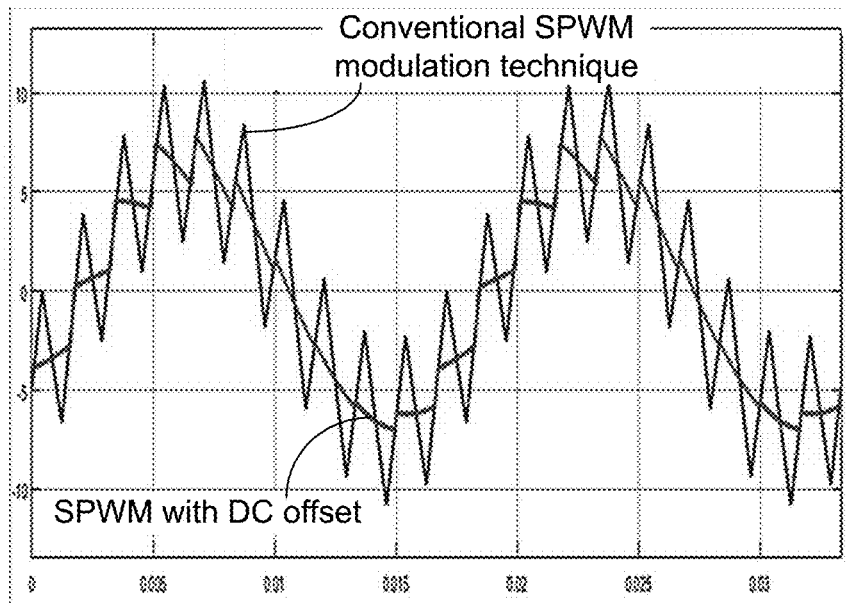

FIG. 10A shows the modulation waveforms for the conventional SPWM and output voltage and current waveforms and FIG. 10B shows the modulation waveforms for the disclosed SPWM with DC offset and output voltage and current waveforms. FIG. 10C is a plot of the spectrums of the generated voltages and FIG. 10D compares the current waveforms.

FIG. 10B shows that when modulation is small, the proposed technique has a large DC offset and the generated time-domain $V_{OA}$ is different with the $V_{OA}$ generated by the conventional SPWM. FIG. 12C shows that the proposed SPWM technique with DC offset has the same fundamental component as conventional SPWM but the harmonics are significantly reduced. For the first significant harmonic (the switching harmonic), the peak value is reduced by more than 6 times. FIG. 10D shows the current waveforms, and illustrates that the fundamental current of different waveforms is identical, but the ripple of the SPWM technique with DC offset is significantly smaller than the conventional modulation techniques.

Figure 11A:
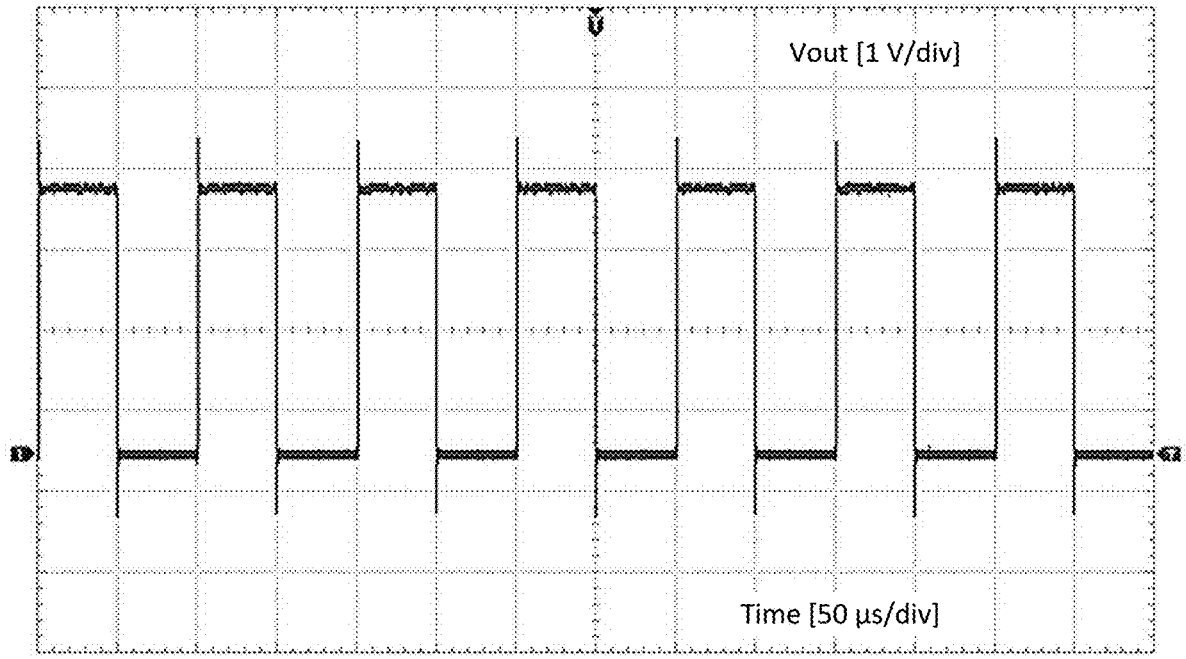
FIGS. 11A-11D illustrate examples of experimental results for SPWM modulation without and with DC offset, in accordance with various embodiments of the present disclosure.
Figure 11B:
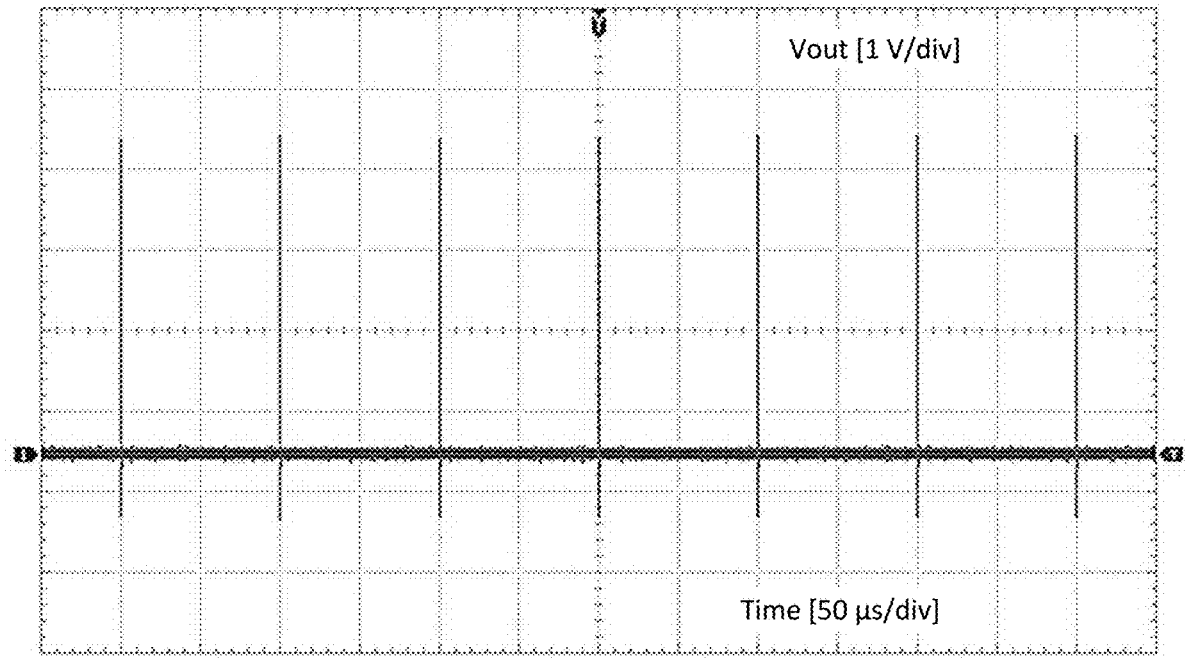
Figure 11C:
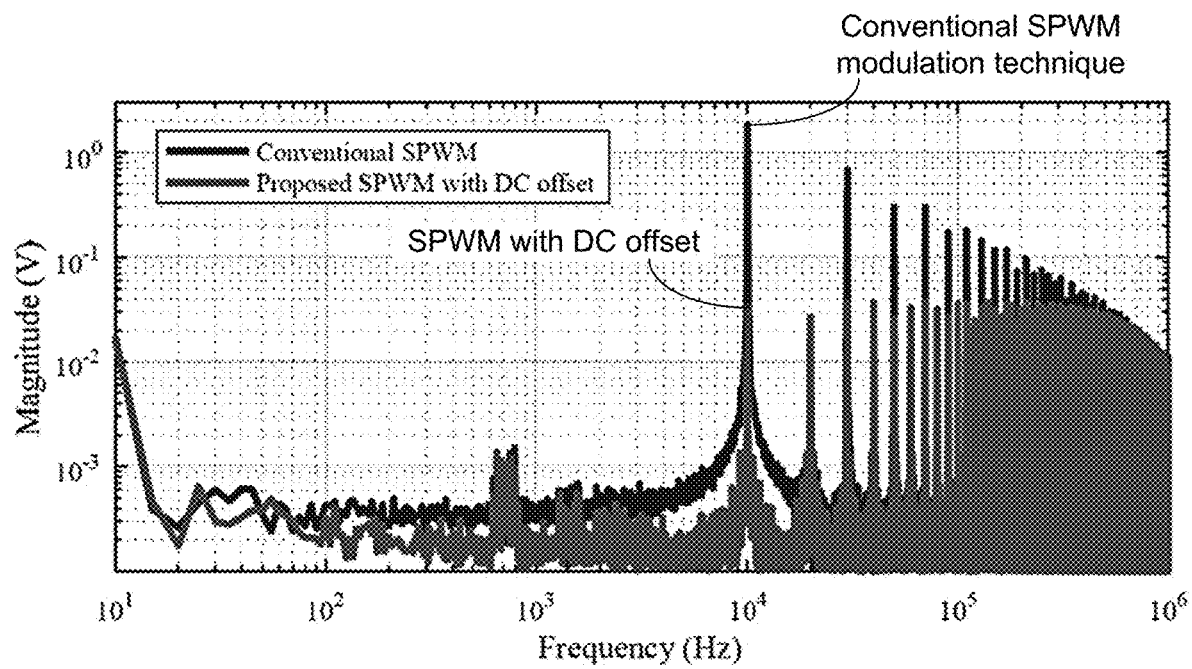
Figure 11D:
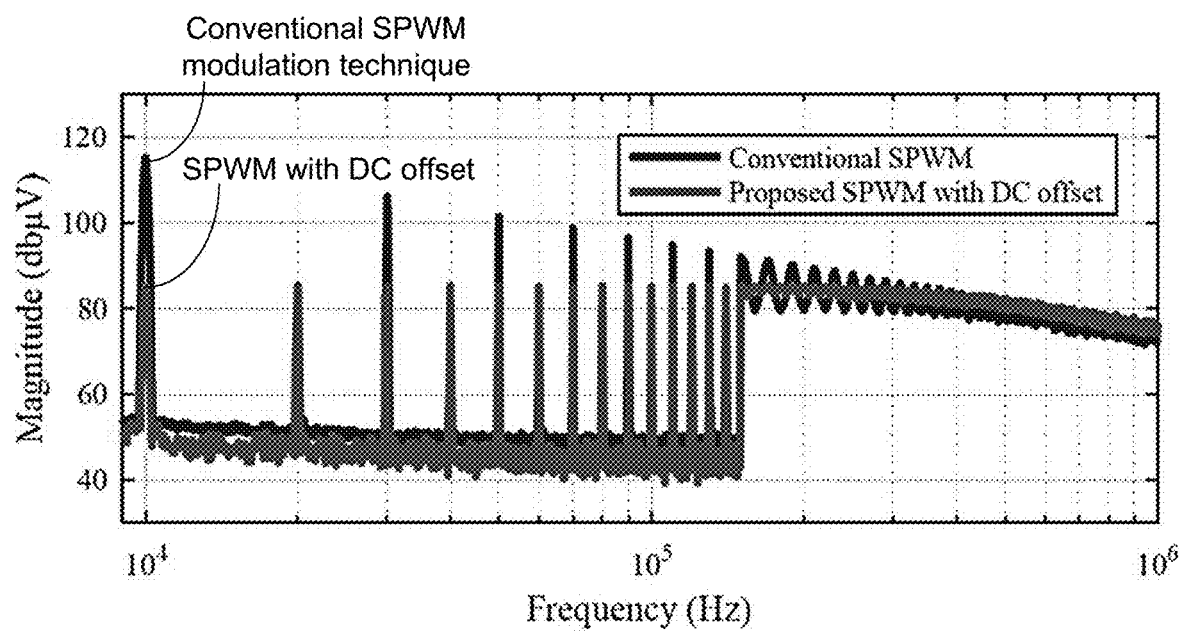

A test circuit was utilized to verify the simulation results. FIGS. 11A and 11B show experimental results comparing the output waveform with conventional SPWM (FIG. 11A) and the output waveform with SPWM with DC offset (FIG. 11B) at a switching frequency of $f_{sw}$=10 kHz. FIG. 11C shows the spectrums extracted with FFT results, and FIG. 11D shows the spectrums measured with a peak detector. The results illustrate that SPWM technique with DC offset does not change the fundamental component, but decreases the first significant harmonic more than 15 dB. Because the digest focuses on the frequency range within 10 kHz to 150 kHz (as regulated in EN 50121-3), this harmonic decrease is in EMI range. For harmonics with frequency larger than 150 kHz, the improvement is not that significant, but the disclosed technique with DC offset is still valuable, because the first significant harmonic is usually the most critical harmonic to be considered in EMI filter design.

Three Phase Bridge Rectifier/Inverter.

Figures 12A, 12B:
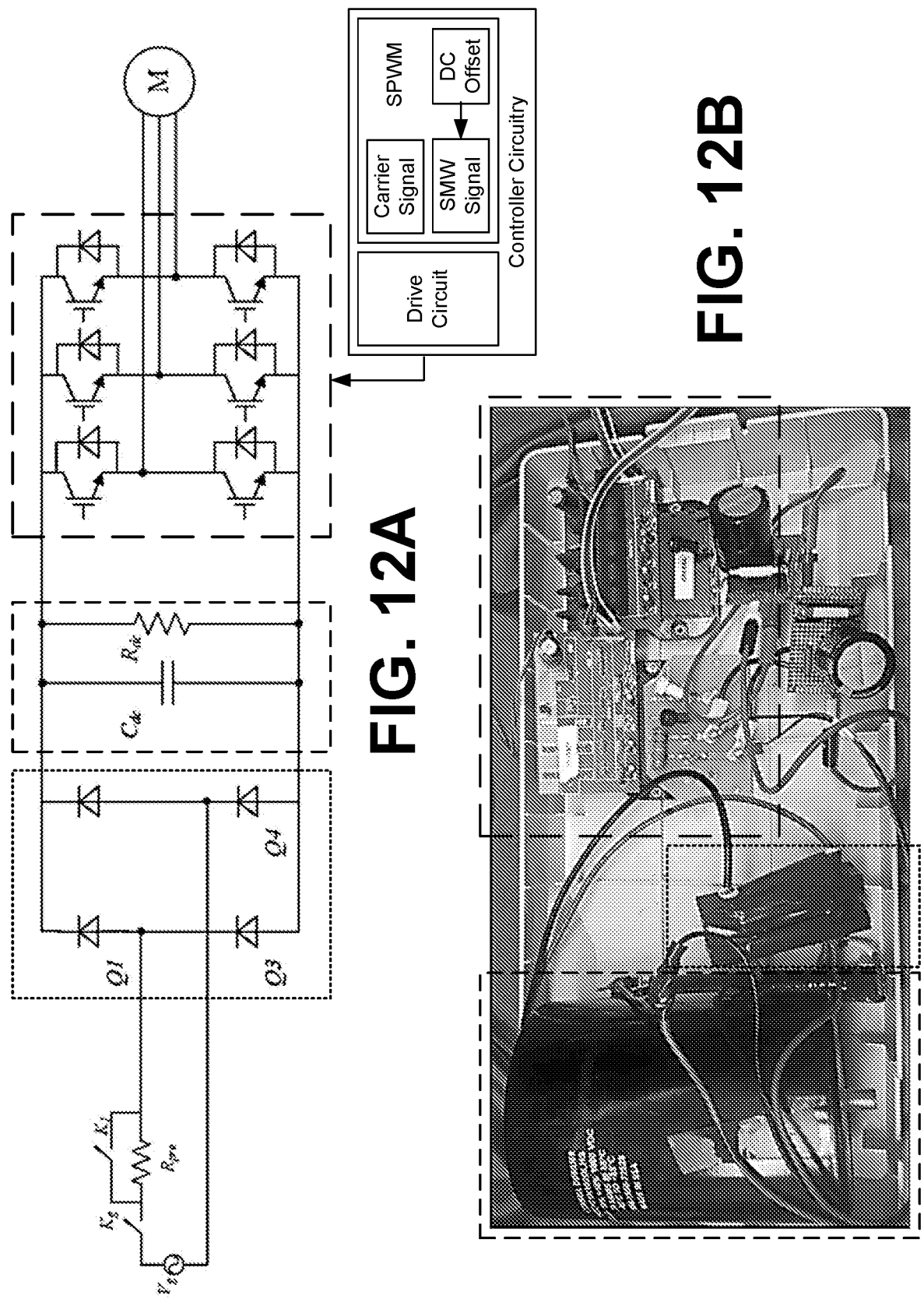
FIGS. 12A and 12B illustrate a three phase switching circuit used for experimental testing, in accordance with various embodiments of the present disclosure.
Figure 12C:
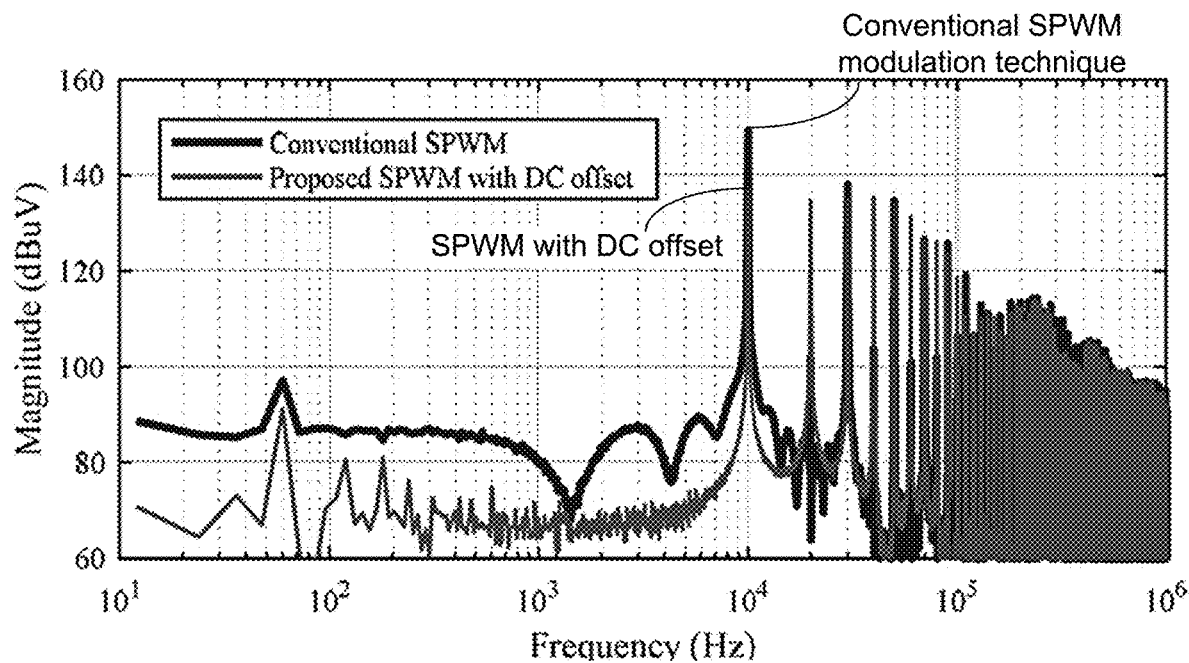
FIGS. 12C-12F illustrate results for the three phase switching circuit of FIGS. 12A and 12B, in accordance with various embodiments of the present disclosure.

FIG. 12A shows a schematic diagram illustrating the topology of the three phase rectifier/inverter circuit used to validate the simulation results, and FIG. 12B is an image of the implemented device. Controller circuitry including a processor, and drive circuitry for the switches (e.g., MOSFETs, IGBTs, diodes) can control switching operation of the rectifier/inverter circuit.

Figure 12D:
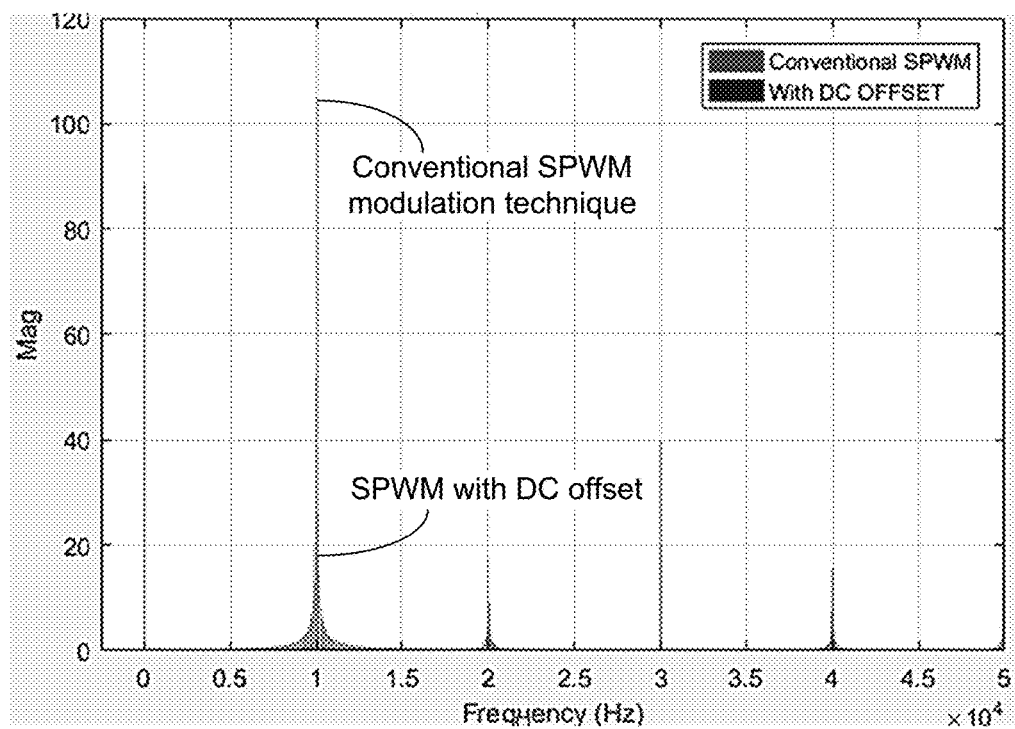
Figure 12E:
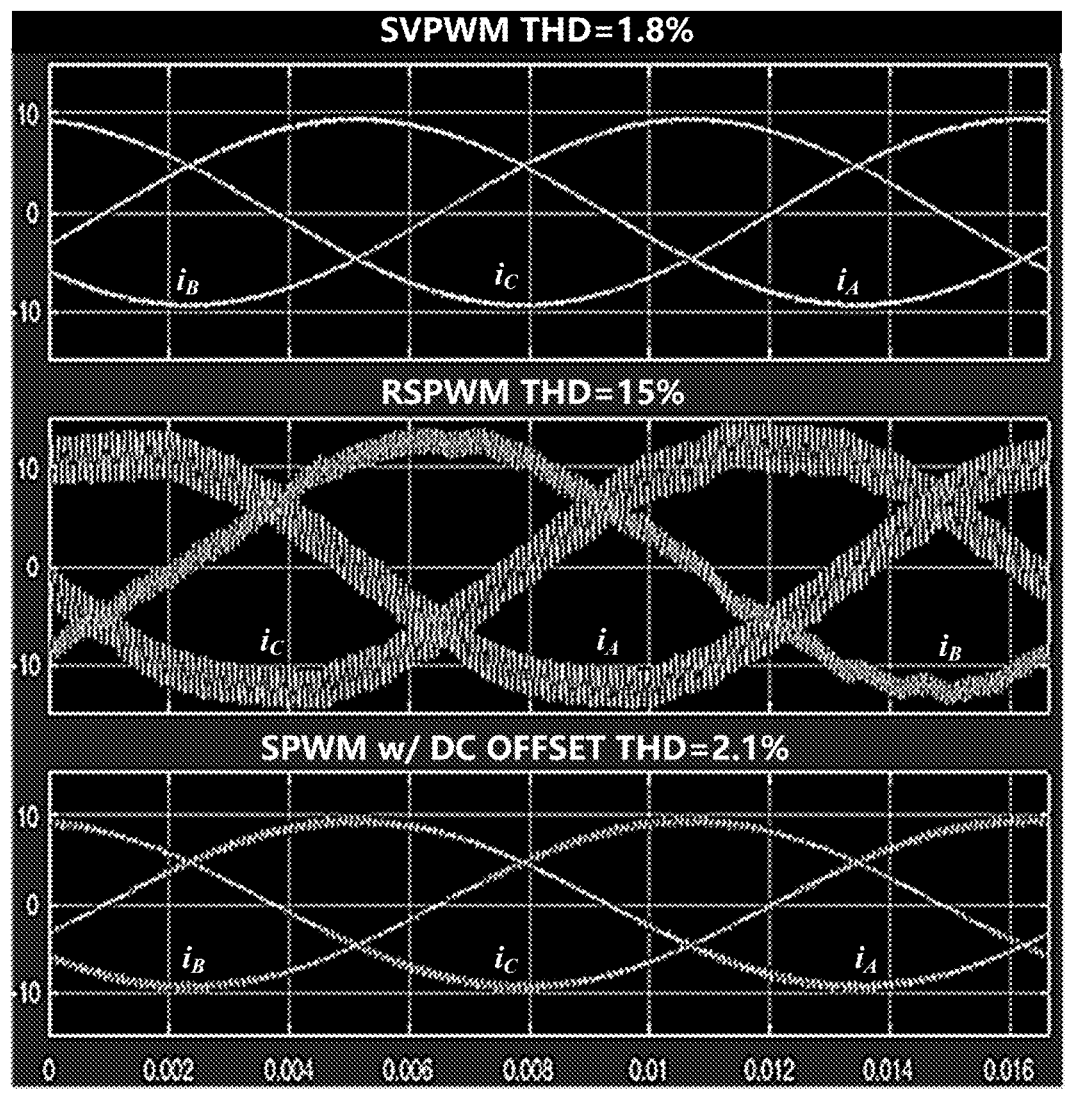
Figure 12F:
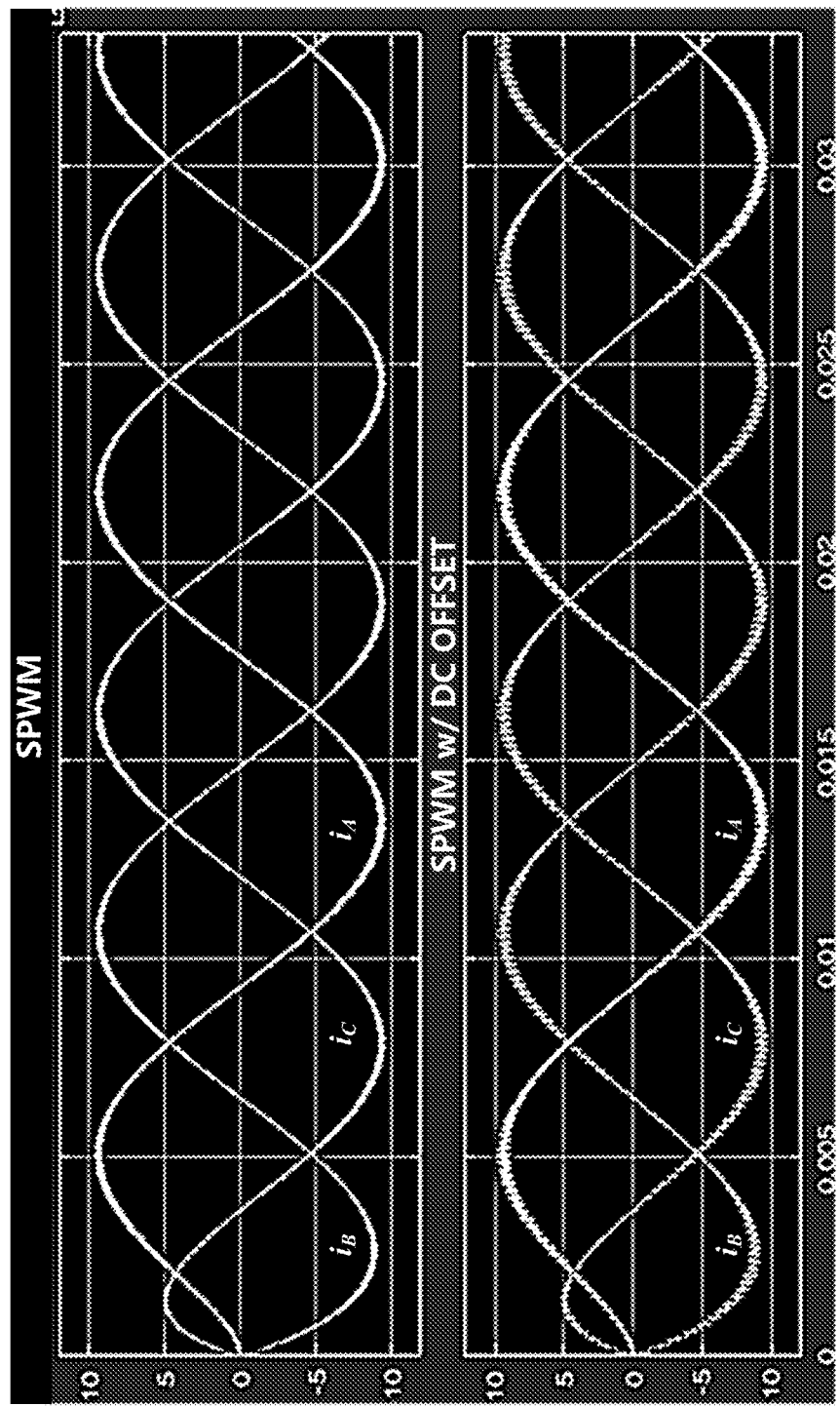

Experimental results for the three phase circuit are shown in FIGS. 12C-12F. The three phase CM spectrums for the conventional SPWM and the disclosed SPWM with DC offset are compared in FIG. 12C. As can be seen, the lower frequency components are reduced with the DC offset. The CM voltage magnitudes are also significantly reduced using SPWM with DC offset as shown in FIG. 12D. In FIG. 12E, three phase current response ($i_A$, $i_B$, $i_C$) are compared for a SVPWM technique, a RSPWM technique and for SPWM with DC offset. While the DM noise in some advanced modulation techniques such as RSPWM can be increased, the DC offset has very little effect on the DM current. Since there is now DC component in the DM voltage, three phase current response does not change from SPWM when the disclosed SPWM with DC offset is used, as illustrated in FIG. 12F.

A closed loop form for a single switch has been derived, and a modulation technique with DC offset has been disclosed that can reduce both harmonic content and EMI noise in rectifier/inverter circuits. Both simulation and experimental results verify the expression for total energy and show that the SPWM technique with DC offset is effective for harmonic reduction. The implementation provides a significant improvement. The modulation technique with DC offset can be used in half bridge, H-bridge and three phase bridge circuits to improve operation as desired.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method for electromagnetic interference energy mitigation, comprising:
   applying a DC offset to a sinusoidal modulation waveform to change an average duty cycle of a switching circuit to less than 0.5 or greater than 0.5, the average duty cycle based upon a modulation index of the sinusoidal modulation waveform; and
   controlling switching of an array of switches of the switching circuit to operate with the average duty cycle using sinusoidal pulse width modulation (SPWM) based at least in part upon the offset sinusoidal modulation waveform and a carrier waveform, thereby reducing total energy of an output of the array of switches.

2. The method of claim 1, wherein a modulation index range of the switching circuit is less than 0.6.

3. The method of claim 2, wherein the modulation index range is less than 0.4.

4. The method of claim 1, wherein the average duty cycle is less than 0.5.

5. The method of claim 1, wherein the average duty cycle is less than a half of the modulation index of the sinusoidal modulation waveform.

6. The method of claim 5, wherein the DC offset of the sinusoidal modulation waveform is limited by the modulation index of the sinusoidal modulation waveform.

7. The method of claim 5, wherein the modulation index is adjusted to achieve a defined THD (total harmonic distortion) without saturation.

8. The method of claim 1, wherein the carrier waveform is a sawtooth waveform or a triangular waveform.

9. The method of claim 1, wherein the switching circuit is a half bridge circuit, an H-bridge circuit or a three-phase bridge circuit.

10. A system, comprising:
    a switching circuit comprising an array of semiconductor switches that control application of a voltage source to a load; and
    controller circuitry configured to control switching of the array of semiconductor switches using sinusoidal pulse width modulation (SPWM) by applying a DC offset to a sinusoidal modulation waveform to change an average duty cycle of the switching circuit to less than 0.5 or greater than 0.5, the average duty cycle based upon a modulation index of the sinusoidal modulation waveform, thereby reducing total energy of an output of the array of switches.

11. The system of claim 10, wherein the average duty cycle is less than a half of the modulation index of the sinusoidal modulation waveform.

12. The system of claim 11, wherein the DC offset of the sinusoidal modulation waveform is limited by the modulation index of the sinusoidal modulation waveform.

13. The system of claim 11, wherein the modulation index is adjusted to achieve a defined THD (total harmonic distortion) without saturation.

14. The system of claim 12, wherein the modulation index is adjusted to reduce total demand distortion (TDD).

15. The system of claim 10, wherein the carrier waveform is a sawtooth waveform or a triangular waveform.

16. The system of claim 15, wherein switching of the array of semiconductor switches is controlled with the SPWM using regular sampling with a stepped sinusoidal modulation waveform or natural sampling with a sine wave sinusoidal modulation waveform.

17. The system of claim 16, wherein the natural sampling is symmetric or asymmetric.

18. The system of claim 10, wherein the switching circuit is a half bridge circuit, an H-bridge circuit or a three-phase bridge circuit.

19. The system of claim 10, wherein a modulation index range is less than 0.6.

20. The system of claim 19, wherein the average duty cycle is equal to or less than half of the modulation index.

* * * * *